(12) United States Patent
Feng et al.

(10) Patent No.: US 7,305,432 B2
(45) Date of Patent: Dec. 4, 2007

(54) PRIVACY PREFERENCES ROAMING AND ENFORCEMENT

(75) Inventors: An Feng, Cupertino, CA (US); Frank Minjarez, Hillsborough, CA (US)

(73) Assignee: AOL LLC, Dulles, VA (US)

( * ) Notice: Subject to any disclaimer, the term of this patent is extended or adjusted under 35 U.S.C. 154(b) by 787 days.

(21) Appl. No.: 10/279,263

(22) Filed: Oct. 23, 2002

(65) Prior Publication Data

US 2004/0083243 A1   Apr. 29, 2004

(51) Int. Cl.
*G06F 15/16* (2006.01)
*G06F 15/173* (2006.01)
*H04L 9/32* (2006.01)
(52) U.S. Cl. .............. 709/203; 709/223; 709/224; 709/225; 709/226; 726/26; 726/27
(58) Field of Classification Search ............. 709/203, 709/223–226; 726/26–27
See application file for complete search history.

(56) References Cited

U.S. PATENT DOCUMENTS

| | | | |
|---|---|---|---|
| 5,815,195 A | 9/1998 | Tam | 348/13 |
| 6,141,760 A | 10/2000 | Abadi et al. | 713/202 |
| 6,154,738 A | 11/2000 | Call | 707/4 |
| 6,185,573 B1 | 2/2001 | Angelucci et al. | 707/104 |
| 6,253,203 B1 | 6/2001 | O'Flaherty et al. | 707/9 |
| 6,263,362 B1 | 7/2001 | Donoho et al. | 709/207 |
| 6,275,824 B1 | 8/2001 | O'Flaherty et al. | 707/9 |
| 6,278,904 B1 | 8/2001 | Ishii | 700/245 |
| 6,308,203 B1 | 10/2001 | Itabashi et al. | 709/217 |
| 6,327,574 B1 | 12/2001 | Kramer et al. | 705/14 |
| 6,335,927 B1 | 1/2002 | Elliott et al. | 370/352 |
| 6,356,936 B1 | 3/2002 | Donoho et al. | 709/206 |
| 6,418,441 B1 | 7/2002 | Call | 707/10 |
| 6,496,855 B1 * | 12/2002 | Hunt et al. | 709/217 |
| 6,832,321 B1 * | 12/2004 | Barrett | 726/11 |
| 6,886,101 B2 * | 4/2005 | Glazer et al. | 726/26 |
| 6,941,472 B2 * | 9/2005 | Moriconi et al. | 726/11 |
| 7,043,497 B1 * | 5/2006 | Carty et al. | 707/102 |
| 7,120,695 B2 * | 10/2006 | Nilsson et al. | 709/228 |
| 2002/0029201 A1 * | 3/2002 | Barzilai et al. | 705/80 |
| 2002/0104015 A1 * | 8/2002 | Barzilai et al. | 713/201 |

(Continued)

FOREIGN PATENT DOCUMENTS

EP    991 005    4/2000

(Continued)

OTHER PUBLICATIONS

*Platform for Privacy Preferences (P3P) Project*; P3P Public Overview; W3C http://www.w3.org/P3P/.

(Continued)

*Primary Examiner*—Nathan J. Flynn
*Assistant Examiner*—Joshua Joo
(74) *Attorney, Agent, or Firm*—Michael A. Glenn; Glenn Patent Group

(57) ABSTRACT

The invention comprises a system and method for management of Web users' privacy preferences. In the distributed system, a Web user has a single set of privacy preferences. The single set of privacy preferences and any of its modifications are propagated among Web browsers and Web services. The user's own privacy preferences are enforced at Web services based on the requester's privacy policies.

6 Claims, 4 Drawing Sheets

U.S. PATENT DOCUMENTS

| | | | |
|---|---|---|---|
| 2002/0143770 A1* | 10/2002 | Schran et al. | 707/10 |
| 2002/0174073 A1* | 11/2002 | Nordman et al. | 705/64 |
| 2002/0188572 A1* | 12/2002 | Bleizeffer et al. | 705/64 |
| 2003/0084300 A1* | 5/2003 | Koike | 713/182 |
| 2003/0115484 A1* | 6/2003 | Moriconi et al. | 713/201 |
| 2005/0022006 A1* | 1/2005 | Bass et al. | 713/201 |

FOREIGN PATENT DOCUMENTS

| | | |
|---|---|---|
| EP | 992 924 | 4/2000 |
| EP | 990 972 | 5/2000 |
| EP | 1 081 916 | 3/2001 |
| EP | 1 089 196 | 4/2001 |
| EP | 1 089 200 | 4/2001 |
| EP | 1 223 757 | 7/2002 |
| WO | WO 02/20498 | 3/2001 |
| WO | WO 01/45022 | 6/2001 |

OTHER PUBLICATIONS

*Microsoft, AOL Become Privacy Gatekeepers*—Marius Meland; Forbes.com; Apr. 7, 2000.

*Securing Your Internet Connection*; E. Rabinovitch; IEEE Communications Magazine; Jun. 2002.

*The Platform for Privacy Preferences 1.0 (P3P1.0) Specification*; W3C Recommendation; Apr. 16, 2002; http://www.w3.org/TR/P3P/.

* cited by examiner

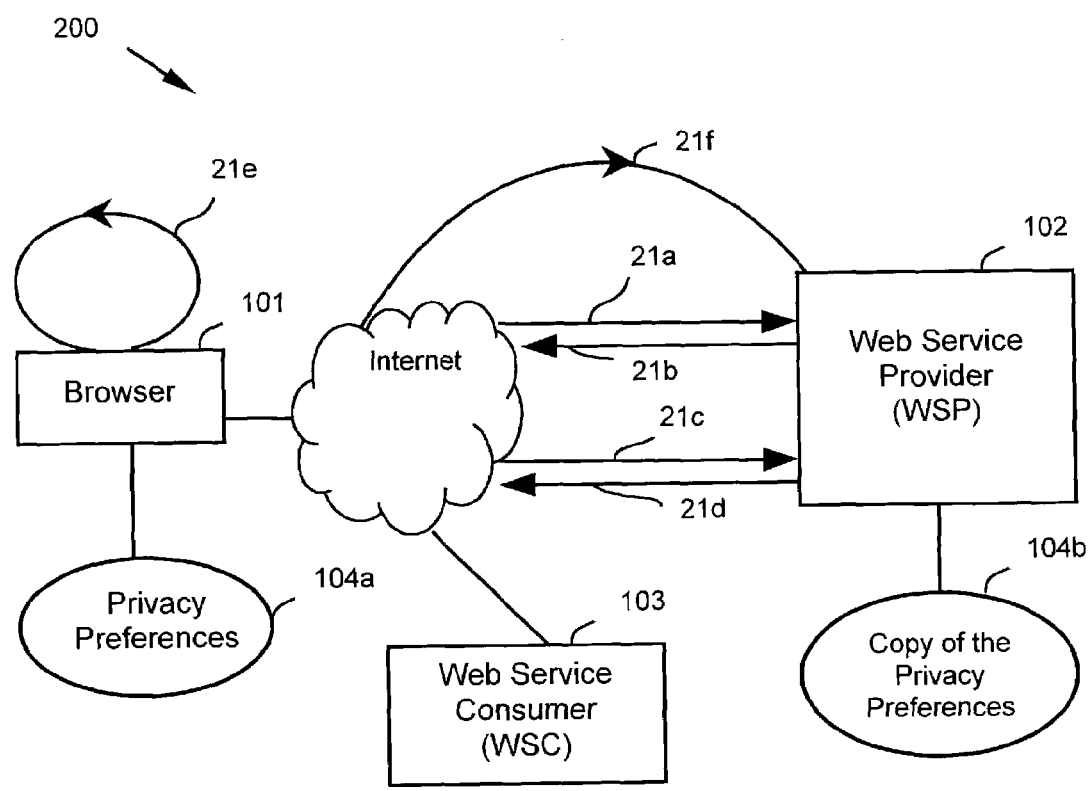

PRIVACY PREFERENCES ROAMING AND ENFORCEMENT

BACKGROUND OF THE INVENTION

1. Technical Field

The invention relates generally to Internet based centralized user privacy preferences management technology. More particularly, this invention relates to a system and method for user privacy preferences roaming among clients and Web services and privacy enforcement at Web services base on the requesters' privacy policies.

2. Description of the Prior Art

The Platform for Privacy Preferences Project (P3P), developed by the World Wide Web Consortium, is emerging as an industry standard providing a simple, automated way for users to gain more control over the use of personal information on Web sites they visit. P3P has been designed to promote privacy and trust on the Web by enabling Web services to disclose their information practices, and enabling Web users to make informed decisions about the collection and use of their personal information.

P3P is an important building block of a new privacy protection concept that increasingly focuses on transparency and market-economy elements. At its most basic level, P3P is a standardized set of multiple-choice questions, covering all the major aspects of a Web site's privacy policies. Taken together, they present a clear snapshot of how a site handles personal information about its users. P3P-enabled Web sites make this information available in a standard, machine-readable format. P3P-enabled browsers can read this snapshot automatically and compare it to the consumer's own set of privacy preferences. P3P enhances user control by putting privacy policies where users can find them, in a form users can understand, and, most importantly, enables users to act on what they see.

P3P allows users' Web browsers to understand Web sites' privacy practices automatically. Privacy policies are embedded in the code of a Web site. Browsers read the policy, and then, automatically provide certain information to specific Web sites based on the preferences set by the users and stored as a User Preference file on the user's computer. The User Preference file specifies what kinds of practices the user will accept, what kinds should be rejected, and what kinds should cause the program to prompt the user to decide how to respond.

The P3P specification provides syntax for specifying privacy policies, privacy preferences (APPEL) and a protocol for exchanging information between the Web site and user agent. Sophisticated preferences may be difficult for end-users to specify, even through well-crafted user interfaces. An organization can create a set of recommended preferences for users. Users who trust that organization can install a pre-defined rule set rather than specifying a new set from scratch. It will be easy to change the active rule set on a single computer, or to carry a rule set to a new computer.

Categories are vital to making P3P user agents easier to implement and use; they allow users to express more generalized preferences and rules over the exchange of their data. Categories are often included when defining a new element or when referring to data that the user is prompted to type in, as opposed to data stored in the user data repository. Categories themselves are not data-elements, but are a more generalized description of a set of single data-elements, which belong to this category.

Using the policy-reference-file, by defining realms in the header of the answer, servers can not only define different policies on the same server, but also a same policy for different servers. To define different policies on the same server can be useful, when there are pages, that can be browsed and where the service does not collect any data and other pages for shopping or feedback, where data is collected and a certain purpose would be addressed.

The first major commercial user agent implementation of P3P is Microsoft's Internet Explorer 6 Web browser released in the summer of 2001, which is focused on cookie blocking. Other P3P software (for example, the AT&T Privacy Bird) uses the full P3P policy more extensively than it is used in IE6. IBM released a P3P policy editor tool that Web sites can use to create their P3P policies. This tool has been used by many of the Web sites that adopted P3P.

After all, only few user agents now support P3P privacy preferences. Even these user agents have implemented only partial solutions such as merely dealing with cookies. These browser based P3P privacy preferences are only applicable when the user is using that particular browser. In addition, because Web services design their access control languages, such as XACML (an XML specification for expressing policies for information access over the Internet) from OASIS and HSDL from Microsoft's .NET MyServices, Web users are required to manage multiple sets of privacy preferences, each specified in different languages or tools. Further, none of the Web services enforces user's privacy preferences according to requester's P3P policies.

Therefore, there is a need for a mechanism according to which a user has only a single set of privacy preferences and this single privacy preferences and any of its modifications are propagated among Web browsers and Web services. What is further needed is that the user's privacy preferences are enforced at Web services based on the requester's privacy policies.

SUMMARY OF THE INVENTION

The invention provides a system and method for management of Web users' privacy preferences. In the distributed system, a Web user has a single set of privacy preferences. The single set of privacy preferences and any of its modifications are propagated among Web browsers and Web services. The user's own privacy preferences are enforced at Web services based on the requester's privacy policies. The solution gives Web users integrated control over their online privacy relationships and enhances trust between Web service providers and Web users.

According to one aspect of the invention, each user has a single set of privacy preferences. A user can make changes of their privacy preferences at either his preferred browsers or services. For example, a user could apply P3P preference editor to create his privacy preferences and then import it into his preferred browser. Alternatively, a user can modify his privacy preferences through permission prompts created by Web services.

According to another aspect of the invention, a user's privacy preferences and their changes are propagated among web browsers and web services.

1. Propagation from Web Services to Web Browser:

When a user signs up a Web service provider (WSP) via a browser without P3P privacy preferences, the WSP offers default privacy preferences to the user, and the user can then make necessary modification on the preferences. The result privacy preferences is sent back to user's browser as HTTP response.

In another situation, after a user replied to a permission prompt whether a Web service consumer site (WSC) could access user data on a WSP, the Web service examines whether the user's privacy preferences should be changed. If so, the delta of privacy preference changes is propagated from Web services to the Web browser. If the permission message is hosted by the WSP, then the preference changes are sent back from the WSP to the browser via HTTP response header for user's response. Otherwise, if the permission message is hosted by the WSC, then the preference changes are sent back from the WSP to the browser in two steps: first, SOAP response header is sent from the WSP to the WSC; and second, HTTP response header is sent from the WSC to the browser.

2. Propagation from Web Browser to Web Services:

When a user signs up a Web service via a browser with P3P preferences, the user's privacy preferences is copied from the browser into the new Web service, and the browser records the URL of this new Web service in its ServicePrivacyURLs file, which consists of the URLs of all Web services which contain a copy of user's privacy preferences.

After a user modified his privacy preferences in a browser, for each URL within the ServicePrivacyURLs file, the user's modified privacy preferences is propagated from the browser to the corresponding Web services.

According to another aspect of the invention, users' privacy preferences are enforced at Web services based on the requester's P3P policies. Consider a case that a user accesses the Web site WSC, which in turn accesses a Web service WSP. Web service WSP classifies its user data in terms of P3P categories. This can be done via a list of P3P<DATA-STRUCT> elements. The service request from the WSC to the WSP includes p3pReferenceURL, p3 pModificationTime, and userAccessURL.

Web service WSP then decides whether it needs to update its local cache of WSC's P3P policies/references info based on the incoming parameters p3pReferenceURL+p3 pModificationTime. If so, pull WSC's P3P policies/references information and update local cache appropriately.

The WSP then identifies the WSC's P3P policy used at userAccessURL and evaluate user's privacy preferences against WSC's P3P policies to determine whether the service request is allowed or not.

If user prompt is needed, the WSP prompts users directly or indirectly via the WSC for permission. Response to this permission prompt can result in the changes of the user's privacy preferences.

BRIEF DESCRIPTION OF THE DRAWINGS

FIG. 2 is a schematic flow diagram illustrating a method 200 of propagating a user's privacy preferences from a Web browser to Web services.

DETAILED DESCRIPTION OF THE INVENTION

Terminology

Figure 1:
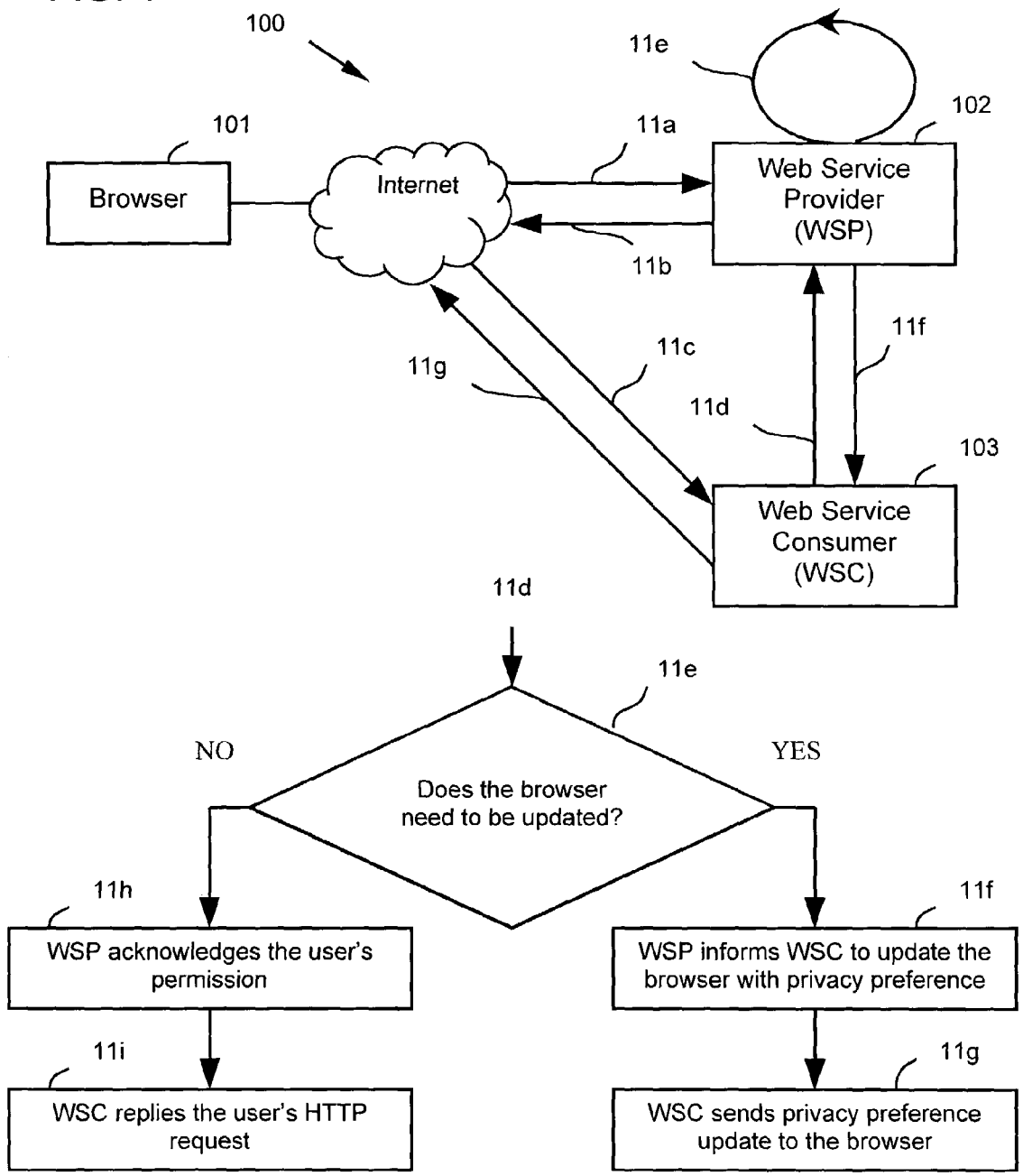
FIG. 1 is a schematic flow diagram illustrating a method 100 of propagating a user's privacy preferences from Web services to Web browser.

The following terms shall have the meaning associated therewith for purposes of the discussion herein;

Data Element—An individual data entity, such as last name or telephone number.

Data Category—A significant attribute of a data element or data set that may be used by a trust engine to determine what type of element is under discussion, such as physical contact information. Categories provide hints to users and user agents as to the intended uses of the data.

Data Set—A known grouping of data elements, such as user.home-info.postal.

Policy—A collection of one or more privacy statements together with information asserting the identity, URI, assurances, and dispute resolution procedures of the service covered by the policy.

Practice—The set of disclosures regarding data usage, including purpose, recipients, and other disclosures.

Preference—A rule, or set of rules, that determines what action(s) a user agent will take. A preference might be expressed as a formally defined computable statement such as the APPEL preference exchange language.

Service—A program that issues policies and (possibly) data requests. By this definition, a service may be a server (site), a local application, a piece of locally active code, such as an ActiveX control or Java applet, or even another user agent. Typically, however, a service is usually a Web site. In this specification the terms "service" and "Web site" are often used interchangeably.

Service Provider (Data Controller, Legal Entity)—The person or legal entity which offers information, products or services from a Web site, collects information, and is responsible for the representations made in a practice statement.

SOAP—Simple Object Access Protocol, which provides a way for applications to communicate with each other over the Internet, independent of Platform. SOAP relies on XML to define the format of the information and then adds the necessary HTTP headers to send it.

Statement—A P3P statement is a set of privacy practice disclosures relevant to a collection of data elements.

URL—Abbreviation of Uniform Resource Locator, the global address of documents and other resources on the World Wide Web. The first part of the address indicates what protocol to use, and the second part specifies the IP address or the domain name where the resource is located.

User—An individual (or group of individuals acting as a single entity) on whose behalf a service is accessed and for which personal data exists. P3P policies describe the collection and use of personal data about this individual or group.

User Agent—A program whose purpose is to mediate interactions with services on behalf of the user under the user's preferences. A user may have more than one user agent, and agents need not reside on the user's desktop, but any agent must be controlled by and act on behalf of only the user. The trust relationship between a user and his agent may be governed by constraints outside of P3P. For instance, an agent may be trusted as a part of the user's operating system or Web client, or as a part of the terms and conditions of an ISP or privacy proxy.

The invention provides a system and method for P3P privacy preferences roaming and enforcement. In this system, each user has a single set of privacy preferences. The user can make changes of his preferences at his preferred browsers or services. For example, a user can apply P3P preference editor to create his privacy preferences and then import it into his preferred browser. Alternatively, the user can modify his privacy preferences through permission prompts created by Web services.

FIG. 1 is a schematic flow diagram illustrating a method 100 of propagating a user's privacy preferences from Web service to Web browser. The method comprises the following steps:

Step 11a: The user signs up a WSP 102 via browser 101 without P3P preferences;

Step 11b: WSP 102 returns "default privacy preferences" to the browser 101, which then records WSP 102's URL in its ServicePrivacyURLs file;

Step 11c: The user visits a Web Service Consumer (hereinafter as WSC) 103;

Step 11d: If a user prompt is returned from the WSP 102 via WSC 103, then WSC 103 sends the user's "permission" to WSP 102;

Step 11e: WSP 102 checks whether the browser 101 needs to be updated;

Step 11f: It the check result in step 11e is yes, then WSP 102 informs WSC 103 to update browser 101 with the "privacy preferences" (SOAP response header from WSP to WSC);

Step 11g: WSC 103 sends the privacy preference update to the browser 101 (HTTP response header from WSC to the browser);

Step 11h: If the check result in step 11e is no, then WSP 102 acknowledges receiving of the user's "permission" forwarded by WSC 103; and Step 11i: WSC 103 replies the user's HTTP request.

FIG. 2 is a schematic flow diagram illustrating a method 200 of propagating a user's privacy preferences from Web browser to Web services. The method comprises the following steps:

Step 21a: The user signs up a Web service provider (WSP) 102 via browser 101 with P3P privacy preferences 104a;

Step 21b: WSP 102 requests the "privacy preferences" from the browser 101;

Step 21c: The browser 101 sends a copy of the user's privacy preferences 104b to WSP 102 and records the WSP 102's URL in the browser's ServicePrivacyURLs file which comprises a list of the URLs of these WSPs containing a copy of the "privacy preferences";

Step 21d: WSP 102 acknowledges the receiving of the user's "privacy preferences";

Step 21e: The user modifies the "privacy preferences" on the browser 101;

Step 21f: The browser 101 updates all registered WSPs about the updated "privacy preferences".

Figure 3A:
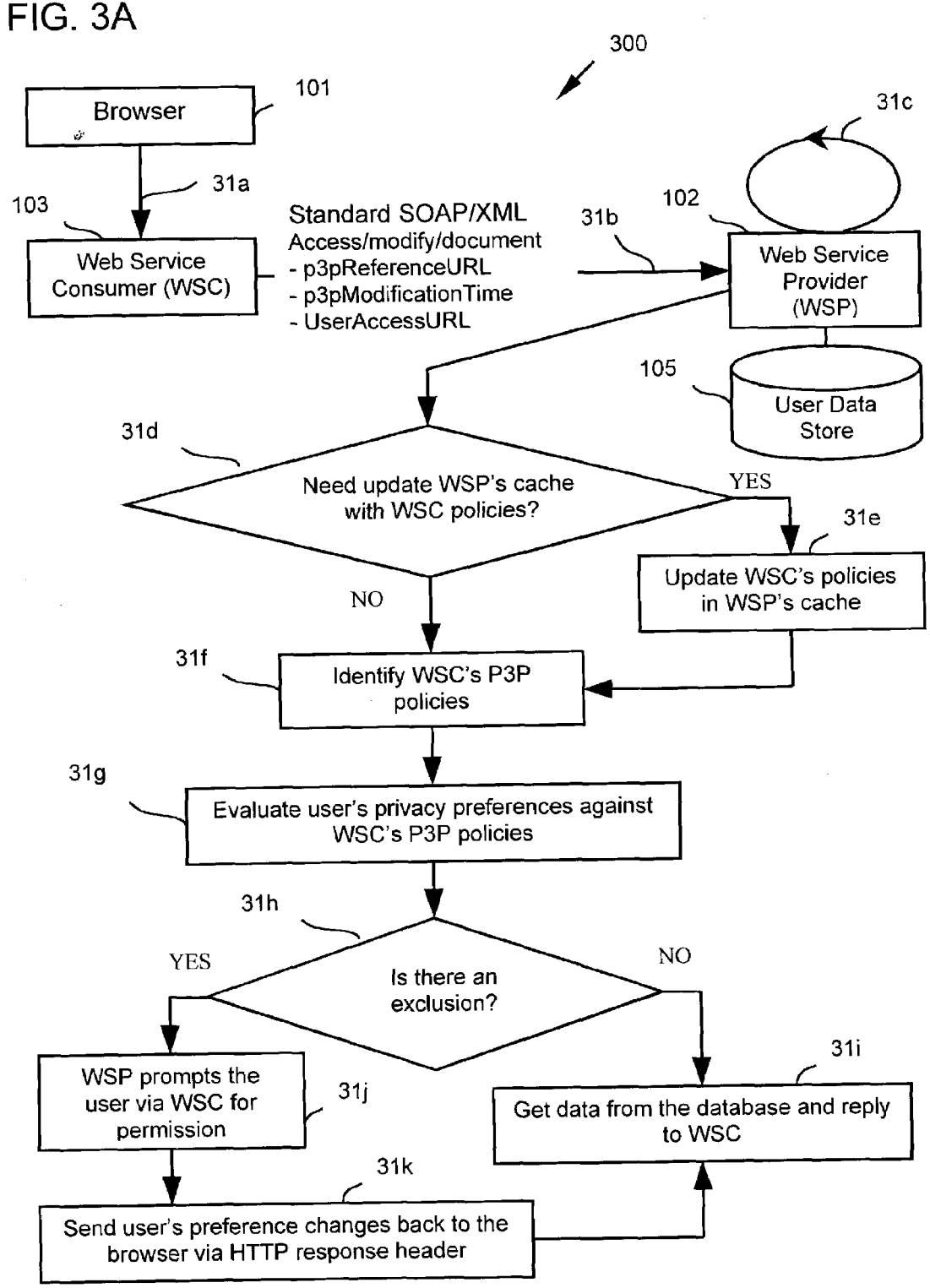
FIGS. 3A-3C are schematic diagrams collectively illustrating a method 300 of enforcing a user's privacy preferences at Web services based on the requester's P3P policies.
Figure 3B:
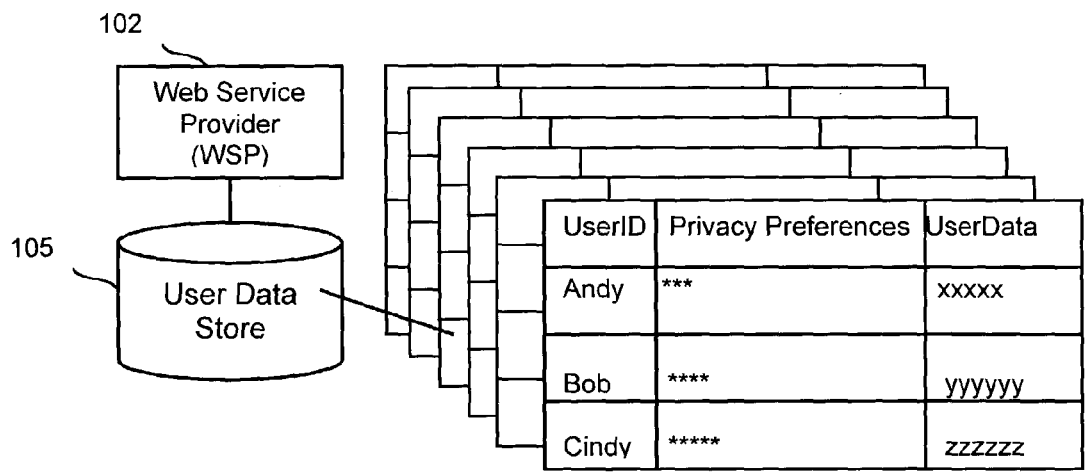
Figure 3C:
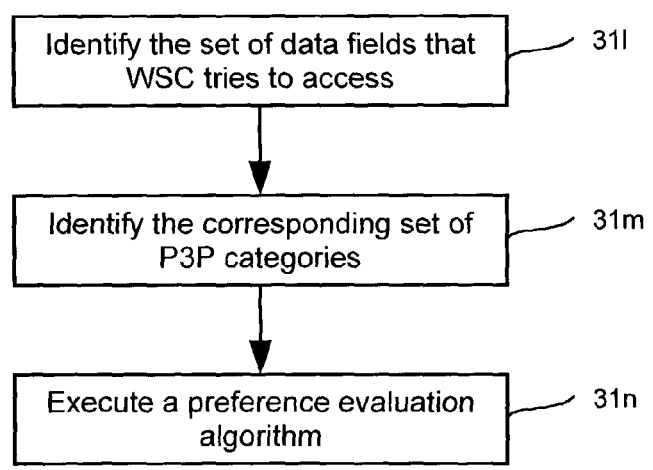

FIGS. 3A-3C are schematic diagrams collectively illustrating a method 300 of enforcing a user's privacy preferences at Web services based on a service requester's P3P policies. The method comprises the following steps:

Step 31a: A user accesses a Web site (WSC) 103;

Step 31b: WSC 103 sends a service request to WSP 102, the service request including the following data:
p3pReferenceURL, which is the URL of WSC's P3P policy reference file;
p3 pModificationTime, which is the latest date/time when WSC modified its P3P policies and/or reference file;
userAccessURL, which is the URL that the user tries to access at WSC.

Step 31c: WSP 102 classifies the user data in terms of P3P categories. This could be done via a list of P3P<DATA-STRUCT> elements. For example:
<p3p: DATA-STRUC Tname="myProfile.contact.name" structref="#personname"><p3p:CATEGORIES><p3p: physical/><p3p:demographic/></p3p:CATEGORIES></ p3p:DATA-STRUCT>

Step 31d: WSP 102 decides whether it needs to update its local cache of WSC's P3P policies/references information based on the incoming parameters p3pReferenceURL and p3 pModificationTime;

Step 31e: If the check result in step 31d is yes, then WSP 102 pulls WSC's P3P policies/references information and updates the local cache appropriately, and continues with step 31f;

Step 31f: If the check result in step 31d is no, then WSP 102 identifies the WSC's P3P policies used at the userAccessURL;

Step 31g: WSP 102 evaluates the user's privacy preferences against WSC's P3P policies;

Step 31h: Checks whether the WSC's P3P policies exclude the user's privacy policies;

Step 31i: If the check result in step 31h is no, then the service request is allowed and WSP 102 gets data from the database 105 as shown in FIG. 3B and replies to WSC 103;

Step 31j: If the check result in step 31h is yes, then WSP 102 prompts the user directly or indirectly via WSC 103 for permission;

Step 31k: Send the user's preference changes back to the browser via HTTP response header for the user's response.

FIG. 3C is a flow diagram illustrating the sub-steps of step 31g in FIG. 3A:

Step 31l: Identify the set of data fields that WSC is trying to access (for example, by executing XPath parsing);

Step 31m: Identify the corresponding set of P3P categories by applying the data-to-P3P-category mapping mentioned above; and Step 31n: Execute a preference evaluation algorithm by taking input parameters such as (1) WSC P3P policy used at userAccessURL and (2) the set of P3P categories that WSC is trying to access.

Although the invention is described herein with reference to the preferred embodiment, one skilled in the art will readily appreciate that other applications may be substituted for those set forth herein without departing from the spirit and scope of the invention.

Accordingly, the invention should only be limited by the claims included below.

The invention claimed is:

1. A method for propagating a user's privacy preferences from a service to a browser comprising the steps of:
a user signing up a service provider via a browser that does not have any privacy preferences;
said service provider returning a set of default privacy preferences to said browser;
said user accessing a service consumer site that is communicatively coupled to said service provider;
said service provider sending the user via said service consumer site a user permission prompt for response;
said user returning a permission response and responsive to said returned response, said service consumer site sending an indicator of said user's permission response to said service provider;
responsive to said user's permission response, said user modifying a copy of said set of default privacy preferences on said service provider; and
said service provider returning via said service consumer site said modified privacy preferences to said browser as a response such that said user has a single set of privacy preferences and such that said browser is updated with the modified privacy preferences;

wherein said user's modified privacy preferences are enforced based on said service consumer's site's privacy policies by said service consumer site sending a service request to said service provider, and said service provider evaluating the user's modified privacy preferences against said service consumer site's privacy policies to determine whether said service request is allowed or not allowed.

2. The method of claim 1, wherein said step of modification can be any of:
  using a preference editor to edit said set of default privacy preferences and importing the edited privacy preferences into said browser; and
  changing said privacy preferences through permission prompts created by any site visited.

3. The method of claim 1, further comprising the steps of:
  checking, by said service provider, whether said browser needs to be updated for said modified privacy preferences;
  if the check result in said check step is yes, then sending back said modified privacy preferences to said browser via a response header for the user's response;
  updating said browser with said modified privacy preferences;
  if the check result in said checking step is no, then acknowledging, by said service provider, receipt of the user's permission; and
  replying, by said service consumer site, the user's request.

4. The method of claim 1, further comprising the steps of:
  checking, by said service provider, whether said browser needs to be updated for said modified privacy preferences;
  if the check result in said checking step is yes, then sending a response header from said service provider to said service consumer site;
  sending a response header from said service consumer site to said browser;
  updating said browser with said modified privacy preferences;
  if the check result in said check step is no, then acknowledging, by said service consumer site, receipt of the user's permission; and
  replying, by said service consumer site, the user's request.

5. An apparatus for propagating a user's privacy preferences from Web service to Web browser, comprising:
  signing up means for a user signing up a service provider via a browser without P3P privacy preferences;
  returning means for said service provider returning a set of default privacy preferences to said browser;
  said service provider sending the user via a reguestor's site a user permission prompt for a response and receiving an indicator of a permission response of said user from said reciuestor's site;
  modifying means for said user modifying a copy of said set of default privacy preferences on said service provider;
  said service provider returning said modified privacy preferences to said browser as an http response such that said user has a single set of privacy preferences and such that said browser is updated with the modified privacy preferences; and
  wherein said user's modified privacy preferences are enforced based on said requestor's site's privacy policies by said requestor's site sending a service reciuest to said service provider, and said service provider evaluating the user's modified privacy preferences against said requestor's site's privacy policies to determine whether said service request is allowed or not allowed.

6. The apparatus of claim 5, wherein the user modifies said default privacy preferences by any of:
  using a P3P preference editor to edit said default privacy preferences and importing the edited privacy preferences into said browser; and
  changing said privacy preferences through permission prompts created by any Web site visited by said user.

* * * * *